(12) United States Patent  
Merithew

(10) Patent No.: US 9,461,761 B1
(45) Date of Patent: Oct. 4, 2016

(54) SKI AREA CONDITIONS REPORTING SYSTEM

(71) Applicant: American Woodduck LLC, Sandpoint, ID (US)

(72) Inventor: Gregg Merithew, Sandpoint, ID (US)

(73) Assignee: American Woodduck LLC, Sandpoint, ID (US)

( * ) Notice: Subject to any disclaimer, the term of this patent is extended or adjusted under 35 U.S.C. 154(b) by 0 days.

(21) Appl. No.: 14/612,133

(22) Filed: Feb. 2, 2015

Related U.S. Application Data

(60) Provisional application No. 61/934,792, filed on Feb. 2, 2014.

(51) Int. Cl.
*H04W 4/02* (2009.01)
*H04H 60/71* (2008.01)

(52) U.S. Cl.
CPC ............. *H04H 60/71* (2013.01); *H04W 4/021* (2013.01)

(58) Field of Classification Search
CPC ... H04W 4/005; H04W 4/021; H04W 60/02; H04W 84/042; H04W 84/12; H04W 88/02; H04B 7/2628; G08B 21/0227; G08B 21/0233; G08B 21/22; G08B 21/0261
See application file for complete search history.

(56) References Cited

U.S. PATENT DOCUMENTS

| | | | |
|---|---|---|---|
| 2006/0181411 A1* | 8/2006 | Fast | G01S 5/0018 340/539.13 |
| 2010/0017126 A1* | 1/2010 | Holcman | G08B 21/0227 701/300 |
| 2010/0148947 A1* | 6/2010 | Morgan | B60R 25/04 340/426.22 |
| 2012/0177010 A1* | 7/2012 | Huang | H04W 4/021 370/335 |
| 2013/0040600 A1* | 2/2013 | Reitnour | G01S 19/17 455/404.2 |
| 2013/0217332 A1* | 8/2013 | Altman | H04H 60/90 455/41.2 |
| 2014/0066018 A1* | 3/2014 | Zhu | H04W 4/008 455/411 |

* cited by examiner

*Primary Examiner* — Nizar Sivji
(74) *Attorney, Agent, or Firm* — Jacob P. Rohwer; Lee & Hayes, PLLC

(57) ABSTRACT

The techniques described herein comprise functionality (e.g., an application) that executes on a user device (e.g., a smartphone) and that is used to submit a ski-related conditions report to a remote device (e.g., a server) so that the ski-related conditions report can be shared with others. The remote device may aggregate and organize the ski-related conditions reports received from devices qualified to be within a pre-defined geo-fence so that, upon receiving requests to view the ski-related conditions reports, the ski-related conditions reports can be shared with others. A pre-defined geo-fence may create a virtual perimeter around a real-world geographic area (e.g., a resort ski area). A ski-related conditions report may include information describing at least one of temperature, visibility, wind, snow accumulation, precipitation, surface conditions, an indication of ski crowds, an indication of a length of time for a chair lift wait, and so forth.

15 Claims, 6 Drawing Sheets

SKI AREA CONDITIONS REPORTING SYSTEM

PRIORITY APPLICATION

This application claims the benefit of U.S. Provisional Application No. 61/934,792, filed Feb. 2, 2014, the entire contents of which are incorporated herein by reference.

BACKGROUND

Typically, snow riders visit a "snow report" web page to view ski-related conditions of a ski area. The snow report web page is usually updated a few times a day by an employee or an agent of the ski area and the ski-related conditions described via the snow report web page provide a general overview of the weather of a greater region (e.g., a zip code in which the ski area is located). However, conditions within a ski area may change rapidly, and therefore, the few updates per day on the snow report web page often fail to accurately capture the current conditions, and consequently, viewers of the snow report web page may be provided with inaccurate and/or old information regarding the ski-related conditions. Moreover, for some ski areas, ski-related conditions in one region (e.g., a particular chair lift on the front side of a ski mountain) may vary significantly from ski-related conditions in another region (e.g., a different chair lift on the back side of the ski mountain) at any given time, and these variations are often not captured on the snow report web page.

SUMMARY

The techniques described herein provide a ski area condition reporting system that allows various snow riders of a ski area to report ski-related conditions and share their ski-related conditions with others. For instance, the ski area condition reporting system may comprise an application that runs on a user device (e.g., a snow rider device such as a smartphone). A snow rider can use his or her device to provide an accurate and current report regarding the conditions, e.g., of the ski area or of a particular region within the ski area. The ski area condition reporting system may aggregate various condition reports from multiple different snow riders and provide the conditions reports to others upon receiving requests to view the ski area conditions reports.

In various examples, automatic locating functionality (e.g., global positioning system (GPS), triangulation, internet protocol (IP) address mapping, etc.) may be used along with a pre-defined geo-fence, e.g., established to define a ski area boundary, to qualify the snow rider as a valid and an approved source for a ski-related conditions report. For instance, in response to identifying that a snow rider device is located within the pre-defined geo-fence, the ski area condition reporting system may enable one or more condition reporting functions (e.g., of an application) on a snow rider device so that a snow rider can submit a conditions report to be shared with other snow riders that are currently riding (e.g., skiing, snowboarding, etc.) at the ski area or that are thinking about visiting the ski area to ride.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
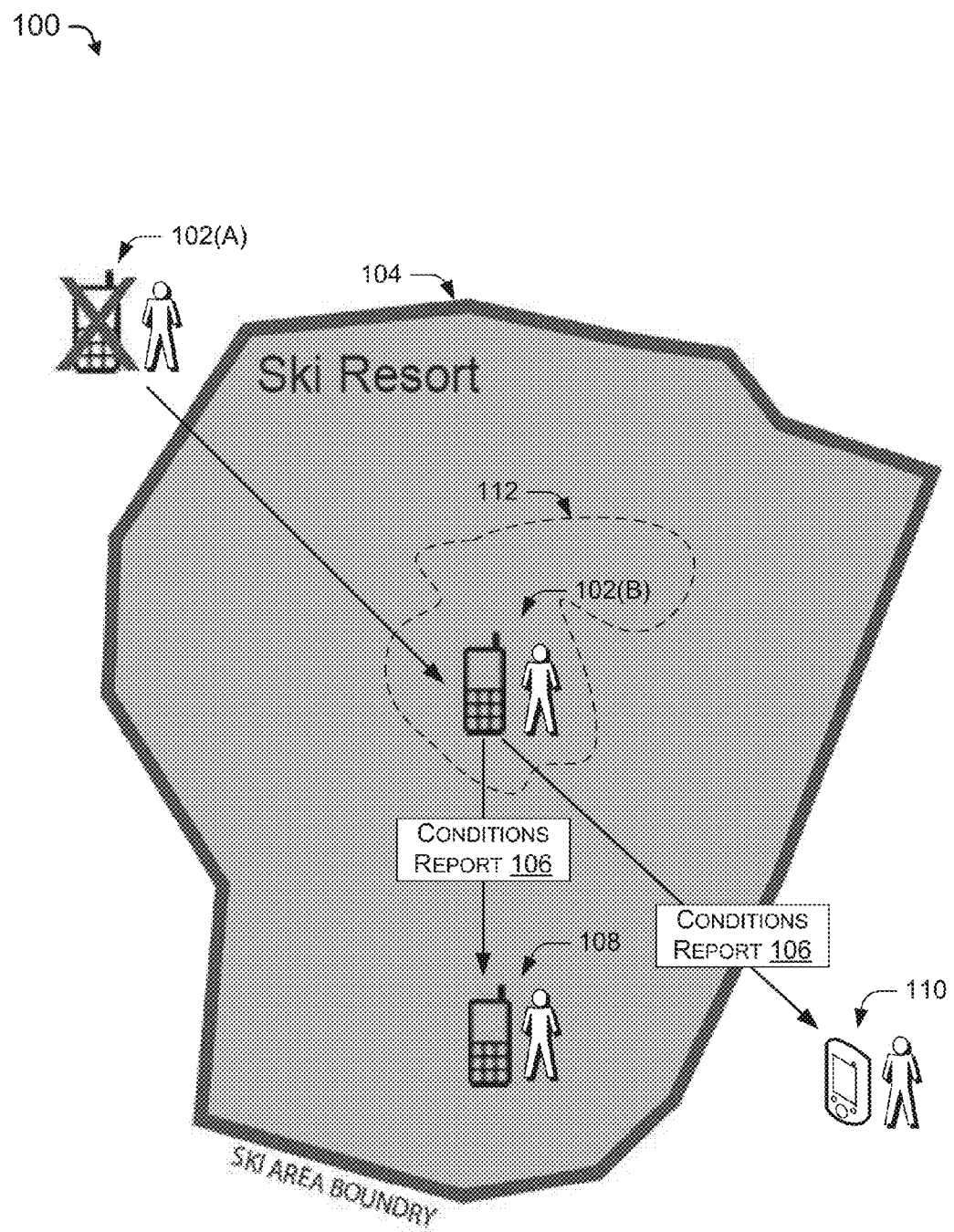
FIG. 1 illustrates an example environment in which a device may be qualified as being located within a pre-defined geo-fence, and therefore, the device is determined to be a valid and an approved source of a conditions report that can be shared with, and viewed on, other devices.

The techniques described herein comprise functionality (e.g., an application) that executes on a user device (e.g., a smartphone) and that is used to submit a ski-related conditions report to a remote device (e.g., a server) so that the ski-related conditions report can be shared with others. The remote device may aggregate and organize the ski-related conditions reports received from devices qualified to be within a pre-defined geo-fence so that, upon receiving requests to view the ski-related conditions reports, the ski-related conditions reports can be shared with others. A pre-defined geo-fence may create a virtual perimeter around a real-world geographic area (e.g., predetermined coordinates that define the boundary of a resort ski area). A ski-related conditions report may include information describing at least one of temperature, visibility, wind, snow accumulation, precipitation, surface conditions (e.g., soft, hard, in sun, out of sun, groomed, powder, deep powder, etc.), an indication of ski crowds (e.g., on a ski run, at a chair lift, in a ski lodge, etc.), an indication of a length of time for a chair lift wait, and so forth.

Accordingly, a snow rider can use his or her device to provide an accurate and current report regarding ski-related conditions, e.g., of the ski area or of a particular region within the ski area. As used herein, a snow rider is anyone that "rides" the snow of a ski area (e.g., a ski mountain), and thus, a snow rider may be referred to as a skier, a snowboarder, and so forth. In various examples discussed herein, the ski-related conditions report are received from devices of current snow riders qualified to be within the pre-defined geo-fence (e.g., a ski area boundary) because these are the people that are able to provide current and more accurate reports regarding the conditions. However, it is understood in the context of this document that ski-related conditions report may also or alternatively be received from devices of other people qualified to be within the pre-defined geo-fence (e.g., a chair lift attendant, a cross country skier, a person snow shoeing, a person riding a snow mobile, a person grooming a ski run, etc.). Accordingly, a qualified device may be configured and enabled to submit an opinion of a user, or a "Snopinion" describing the ski-related conditions.

In various examples, automatic locating functionality (e.g., global positioning system (GPS), triangulation, internet protocol (IP) address mapping, etc.) may be used along with the pre-defined geo-fence, e.g., established to define a ski area boundary, to qualify the snow rider as a valid and an approved source for a ski-related conditions report. In one example, a device of a snow rider must be located inside the pre-defined geo-fence for the condition reports submission features to be enabled. Once identified to be inside the pre-defined geo-fence, a snow rider has the ability to submit and/or post a geographically verified ski-related conditions report, e.g., in real time and to a web-based feed or a mobile feed so that other users wanting to obtain current ski-related conditions can view the ski-related conditions report.

Accordingly, the ski area condition reporting system described herein may use pre-defined geo-fences of various ski areas to collect and sort crowd-sourced reports, e.g., from current riders enjoying a day at the various ski areas.

FIG. 1 illustrates an example environment 100 in which a geographically qualified conditions reports can be submitted and shared with others. As discussed above, the techniques discussed herein do not allow conditions reports to be shared unless a device is qualified as being within a pre-defined geo-fence. Therefore, a snow rider and a user device at 102(A) in FIG. 1 are unable to provide and/or share a conditions report because they are not qualified as being within the pre-defined geo-fence 104, rather, they are disqualified. However, after the snow rider and the user device move to 102(B), which is within the pre-defined geo-fence 104, the snow rider and the user device are able to submit a conditions report 106. For example, the conditions report 106 may be shared with someone (e.g., another snow rider and another snow rider device) located within the pre-defined geo-fence (e.g., located at position 108). This may be a skier located in one region of the ski area but that may be thinking of moving to another region of the ski area if the reported conditions are good. In another example, the conditions report 106 may be shared with someone located outside the pre-defined geo-fence (e.g., located at position 110). For instance, another snow rider may be thinking about visiting the ski area to ride and may want to check the ski-related conditions in advance and before spending the time and money to travel to the ski area to ride.

Furthermore, when the user exits the pre-defined geo-fence 104 (e.g., returns to a location 102(a) outside the pre-defined geo-fence), then the conditions report submission features may be disabled.

In various examples further discussed herein, the conditions report submitted by the user device at 102(B) may also be associated with, or mapped to, a particular region 112 (e.g., a ski run, a chair lift, another element identifiable via a ski area map, etc.) of a plurality of regions defined within the pre-defined geo-fence 104.

In additional examples, the sharing and/or distribution of conditions reports may be based on established relationships. For example, a snow rider may set up a registered account so that only ski-related conditions reports from a select group of snow riders may be viewed. Stated another way, the snow rider may follow, or subscribe to, conditions reports from people (e.g., friends) with which he or she has established a relationship (e.g., a social relationship, a trusted relationship based on common preferred conditions and types of runs, etc.). Accordingly, snow riders that use the application described herein may create and join "ski" groups, within which ski-related conditions reports may be shared. In one implementation, one snow rider may be informed that a buddy snow rider is located at a particular ski area and may have the ability to request a conditions report from the buddy snow rider (e.g., send a notification or a "poke" that pops-up on the buddy's device requesting a conditions report).

Figure 2:
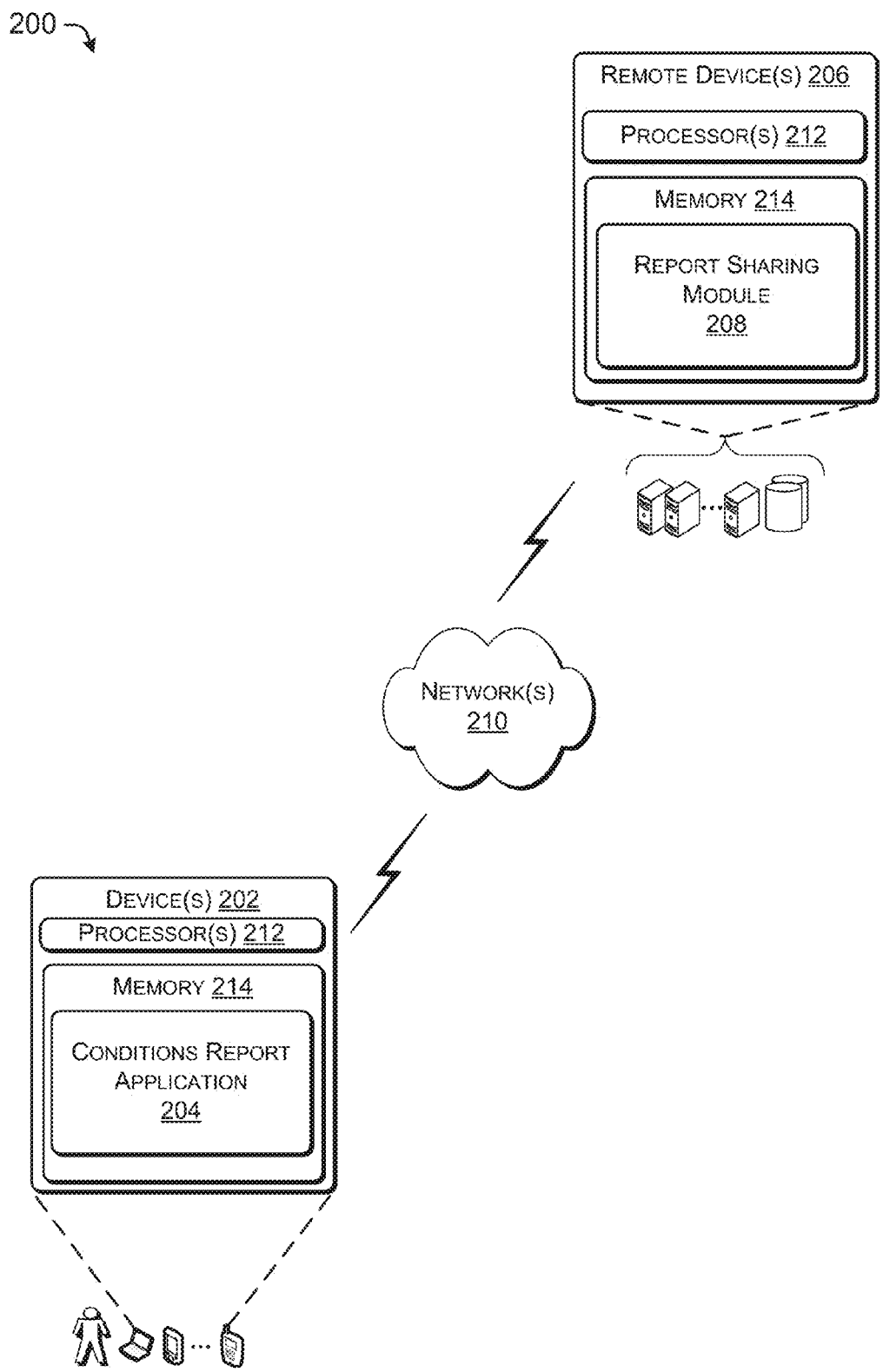
FIG. 2 illustrates an example computing environment that is usable to implement the techniques described herein.

FIG. 2 illustrates an example computing environment 200 that is usable to implement the techniques described herein. The environment 200 includes one or more devices 202 (e.g., a device providing a conditions reports or a device requesting to view a conditions report) that individually include the conditions report application 204 described herein. The environment 200 may also include one or more remote devices 206 that may individually, and separately, include a report sharing module 208 configured to communicate with the devices 202 to receive conditions report, to aggregate and organize the conditions reports, and to transmit/share the conditions reports, as described above. In various examples, the one or more devices 202 may communicate with the one or more remote devices 206 via one or more communication networks 210 to implement the techniques described above.

The devices 202 and/or the remote devices 206 may individually include, but are not limited to, any one of a variety of devices, including portable devices or stationary devices. For instance, a device may comprise a smart phone, a mobile phone, a personal digital assistant (PDA), a wearable device (e.g., a smart watch, electronic glasses, etc.) an electronic book device, a laptop computer, a desktop computer, a tablet computer, a portable computer, a gaming console, a personal media player device, a server computer or any other electronic device.

Therefore, a device 202 and/or a remote device 206 may individually and separately include one or more processors 212 and memory 214. The processor(s) may be a single processing unit or a number of units, each of which could include multiple different processing units. The processor(s) may include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory.

The memory may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 214 may include an operating system configured to manage hardware and services within and coupled to a device for the benefit of other modules, components and devices. In some embodiments, the one or more remote devices 206 may include one or more servers or other computing devices that operate within a network service (e.g., a cloud service). The network(s) 210 may include the Internet, a Mobile Telephone Network (MTN), a local area wireless technology (e.g., Wi-Fi) or other various communication technologies.

Figure 3:
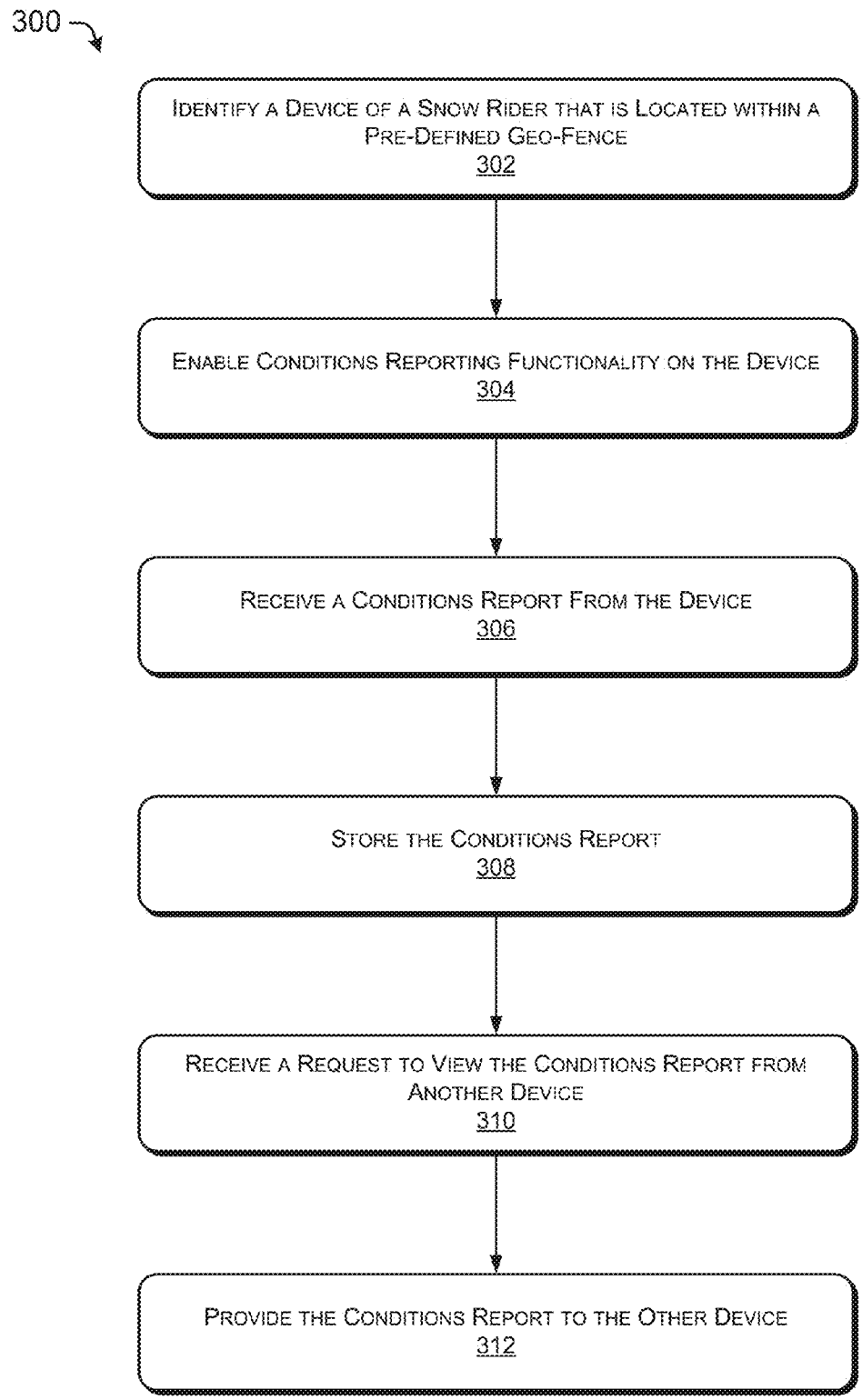
FIG. 3 illustrates an example process that qualifies a device so that conditions reports can be submitted and shared with others.
Figure 4:
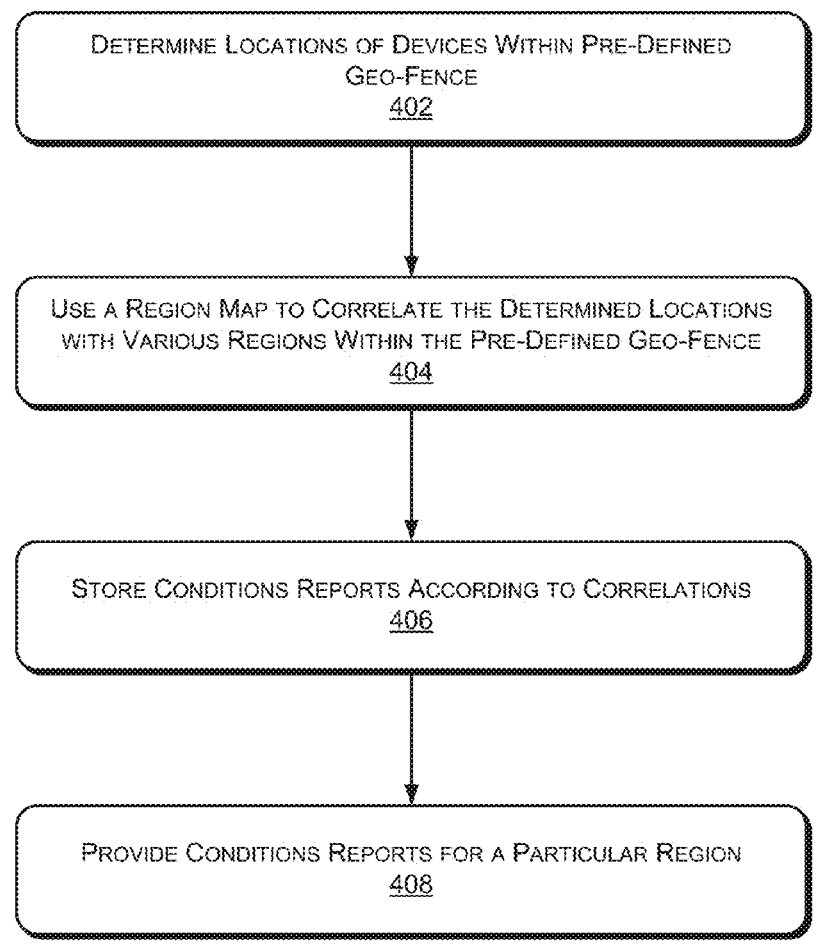
FIG. 4 illustrates an example process that maps a received condition report to a particular region within the pre-defined geo-fence based on a location of a device.

Example operations are described herein with reference to FIG. 3 and FIG. 4. The example processes of FIG. 3 and FIG. 4 are illustrated as a logical flow graph, which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Moreover, the example operations in FIG. 3 and FIG. 4 may be described with reference to the features and/or elements discussed above with respect to FIG. 1 or FIG. 2.

FIG. 3 illustrates an example process 300 that qualifies a device of a snow rider so that conditions reports can be submitted and shared with others.

At operation 302, a device (e.g., of a snow rider) may be identified to be located within a pre-defined geo-fence. For example, the report sharing module 208 may use automatic locating functionality (e.g., GPS) to determine and verify that the device is located within the pre-defined geo-fence (e.g., coordinates where the device is located are within the coordinates of the pre-defined geo-fence that outline a ski area boundary).

At operation 304, one or more conditions reporting functions that permit the device to submit and/or share a conditions report via a remote device 206 may be enabled. In one example, the report sharing module 208 may enable execution of the conditions report application 204 on a device 202 of the snow rider only if the device is identified to be located within the pre-defined geo-fence. In another example, the report sharing module 208 may be configured to receive a conditions report from the conditions report application 204 regardless of a location but may only enable the sharing or distribution of the conditions report to others if the device 202 of the snow rider only if the device is identified to be located within the pre-defined geo-fence.

At operation 306, a conditions report is received from the device. For example, the enabled functions may allow the snow rider to submit a conditions report information describing at least one of temperature, visibility, wind, snow accumulation, precipitation, surface conditions (e.g., soft, hard, in sun, out of sun, groomed, etc.), an indication of ski crowds (e.g., on a ski run, at a chair lift, in a ski lodge, etc.), an indication of a length of time for a chair lift wait, and so forth. The report sharing module 208 may receive the conditions report from the device.

At operation 308, the conditions report is stored. The report sharing module 208 may store the conditions report in a database and the conditions report may be associated with an identified pre-defined geo-fence (e.g., a particular ski area of a plurality of ski areas). Accordingly, the report sharing module 208 may be configured to sort the conditions reports into various ski area buckets so they can be shared based on requests specifying a particular ski area. In some examples, the conditions report is stored with a time in which the conditions report was submitted by the device or received at the remote device. The time may also be shared with the conditions report so viewers can associate the conditions report with an exact time.

At operation 310, a request to view the conditions report may be received from another device. For example, another snow rider within the ski area may use his or her to device to send a request, to the report sharing module 208, to view the conditions report if he or she is thinking of moving to another region of the ski area if the reported conditions are good. The request to view may be associated with a request to view a particular web or mobile feed, e.g., associated with an established ski group. In another example, another snow rider outside the ski area may use his or her to device to send a request, to the report sharing module 208, to view the conditions report if he or she is thinking about visiting the ski area to ride.

At operation 312, the conditions report is provided to the requesting device. For example, the report sharing module 208 may send the conditions report or populate a web feed or mobile feed with the requested conditions report.

FIG. 4 illustrates an example process 400 that maps a received condition report to a particular region within the pre-defined geo-fence based on a location of a device of a snow rider.

At operation 402, locations of devices within a pre-defined geo-fence are determined. These locations may be more exact locations determined by the report sharing module 208 using automatic locating functionality (e.g., GPS). For example, coordinates where the device is located may be determined to be within region coordinates of a particular region within the pre-defined geo-fence.

At operation 404, a region map of the pre-defined geo-fence is used to correlate the determined locations with various regions within the pre-defined geo-fence. For example, the region map may be based on a map of a ski area, and the various regions within the pre-defined geo-fence, may be defined based on at least one identifiable map element including, but not limited to: ski runs, chair lifts, or buildings (e.g., a particular ski lodge, a ski patrol shack, etc.).

At operation 406, the conditions reports are stored according to the correlations. For example, the report sharing module 208 may store a first group of conditions reports from devices located at a particular chair lift or a particular ski run together, while storing a second group of conditions reports from devices located at a different particular chair lift or a different particular ski run together.

At operation 408, conditions reports for a particular region may be provided to a device that requests the conditions reports associated with the particular regions. Consequently, a snow rider in one region of the mountain (e.g., riding a first chair lift with unsatisfactory conditions) can request to view conditions reported for another region of the mountain.

Figure 5:
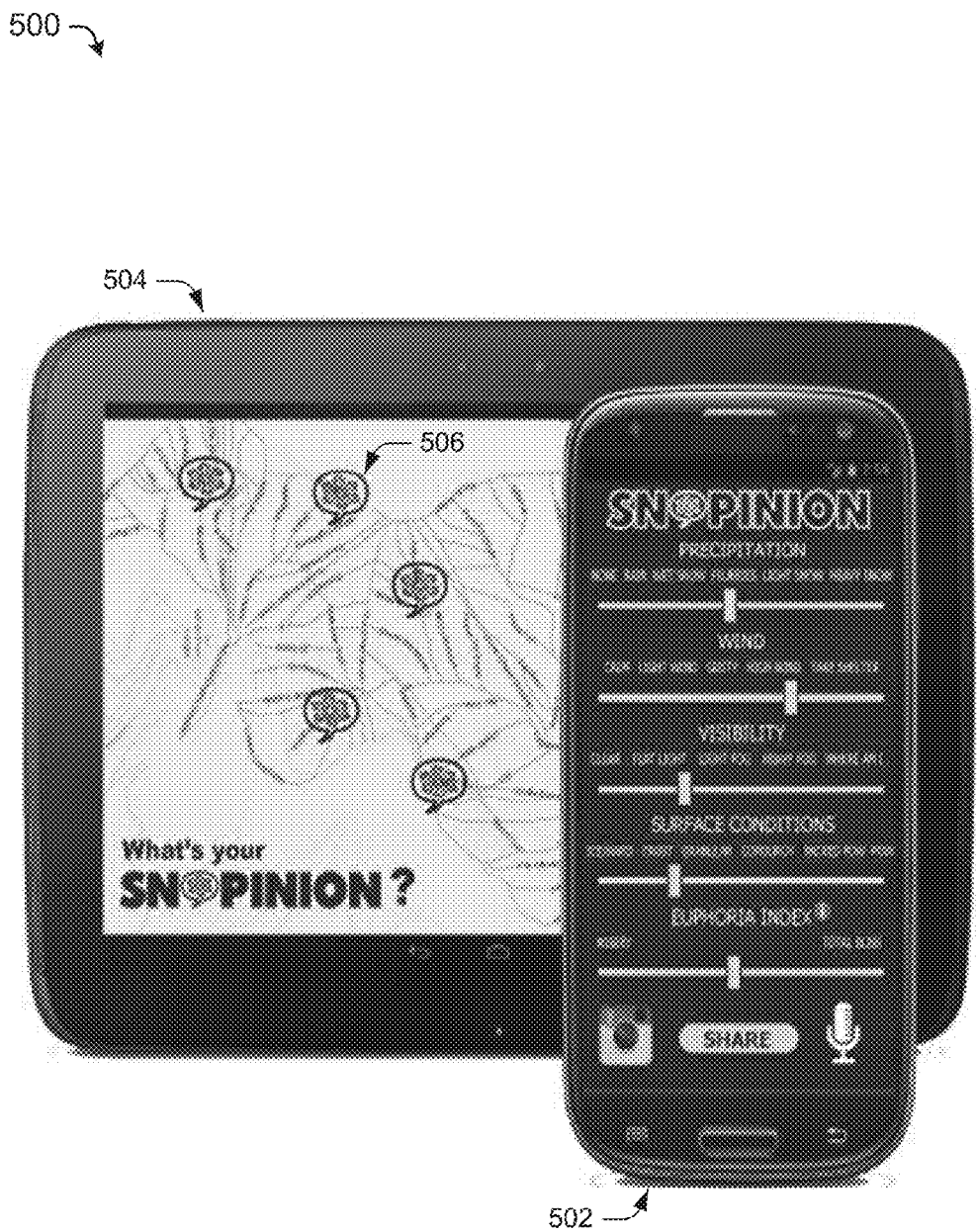
FIG. 5 illustrates example graphical user interfaces that may be used to (i) select ski-related conditions and submit a conditions report, and (ii) view a conditions report from a snow rider that has been qualified as being within the pre-defined geo-fence.

FIG. 5 illustrates example graphical user interfaces 500 that may be used to (i) select ski-related conditions and submit a conditions report, and (ii) view a conditions report from a snow rider that has been qualified as being within the pre-defined geo-fence.

As shown in the example user interface 502, upon activation, the conditions report application 204 may display a series of condition sliders so a user can specify or define, e.g., via sliding the displayed vertical selection bar in a horizontal manner, current ski-related conditions (e.g., for precipitation, wind, visibility, surface conditions, a more general user opinion indicator such as a "Euphoria Index" that ranges from "misery" to "total bliss"). Because it is often very cold on a ski mountain and the user is typically wearing gloves, the example user interface 502 uses condition sliders to minimize and simplify the user interaction required and to avoid the need for the user to have to enter textual input (e.g., via a keyboard or typing interface).

After making the sliding bar selections, a user can submit the conditions report by selecting the "share" button. In addition to submitting the indications via the sliding bar selections, the conditions report application 204 may also allow a user to submit a short audio report (e.g., via the microphone icon in example user interface 502). For example, a user may have their spoken thoughts and/or opinion on the specified conditions recorded and submitted (e.g., a user may state that "the south facing snow conditions are much softer in the back bowl"). As another compliment to the sliding bar selections, the conditions report application 204 may also allow a user to capture and/or submit a photo with the conditions report (e.g., via the camera icon in example user interface 502).

As shown in the example user interface 504, upon activation, the conditions report application 204 may display a map associated with the pre-defined geo-fence (e.g., a map of the ski area showing chairlifts, runs, buildings, etc.). The map may include conditions report icons 506 positioned in association with a particular region. In some examples, the report sharing module 208 may share an individual conditions report in response to selection of a conditions report icon 506. In some examples, the report sharing module 208 may share multiple conditions report (e.g., in a web feed or mobile feed) in response to selection of a conditions report icon 506. Consequently, a user wanting to view snow reports may view a map of a ski area to determine what regions have had a conditions report submitted over a recent period of time (e.g., submitted in the last ten minutes, twenty minutes, etc.), and select a region to view current and accurate conditions.

As discussed above, in various examples, the condition reports icons displayed may be based on established relationships between a provider of the conditions reports and a viewer of the conditions reports (e.g., registered friends, followers of each other, participation in a ski group, etc.).

Figure 6:
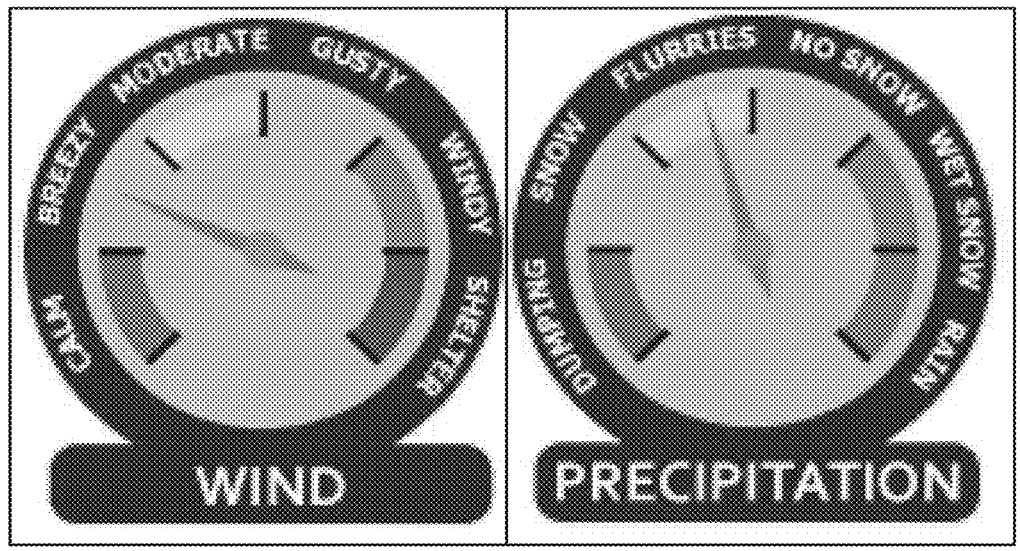
FIG. 6 illustrates example graphical user interfaces that show ski-related conditions generated based on an aggregate of conditions reports received from a plurality of snow riders.
Figure 6:
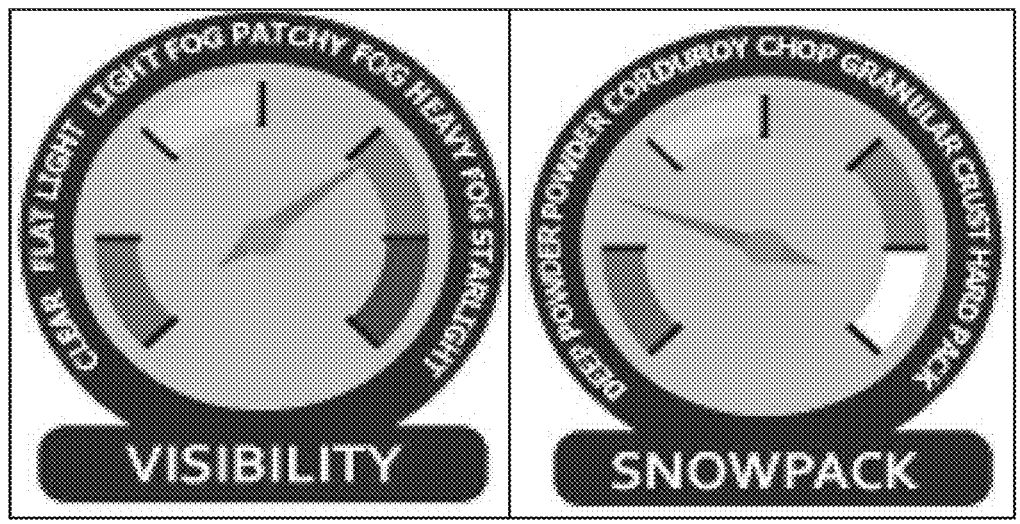

FIG. 6 illustrates example graphical user interfaces 600 that show ski-related conditions generated based on an aggregate of conditions reports received from a plurality of snow riders. For example, for the pre-defined geo-fence, or for a particular region within the pre-defined geo-fence, the report sharing module 208 may determine "aggregate" conditions based on the conditions reports submitted by multiple snow riders. For example, the example user interface 602 shows the aggregate wind condition reported by the group of snow riders. The example user interface 604 shows the aggregate precipitation condition reported by a group of snow riders. The example user interface 606 shows the aggregate visibility condition reported by the group of snow riders. The example user interface 608 shows the aggregate "snowpack" (e.g., surface conditions) condition reported by the group of snow riders. The aggregated results may be compiled and shared based on information received for defined time periods (e.g., fifteen minute intervals, thirty minute intervals, etc.).

CONCLUSION

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A method for sharing a conditions report received from an approved snow rider device, comprising:
    identifying, by one or more hardware processors and via automatic locating functionality, a snow rider device that is located within a pre-defined geo-fence, wherein the pre-defined geo-fence is associated with a ski area boundary and is used to approve the snow rider device as a valid source of conditions reporting;
    in response to identifying the snow rider device, enabling one or more condition reporting functions associated with the snow rider device;
    determining a location of the snow rider device;
    correlating, using a region map associated with the pre-defined geo-fence, the location of the snow rider device with a particular region of a plurality of regions within the region map;
    receiving a conditions report from the snow rider device;
    recording a time when the conditions report is received;
    storing the conditions report in association with the particular region and the time;
    causing a selection mechanism to be displayed on another snow rider device to enable a snow rider of the other snow rider device to make a selection without having to provide textual input,
    receiving, from the other snow rider device, an indication of the selection; and
    providing the conditions report to the other snow rider device based at least in part on the received indication of the selection.

2. The method as recited in claim 1, further comprising:
    determining that the snow rider device has exited the pre-defined geo-fence; and
    in response to determining that the snow rider device has exited the pre-defined geo-fence, automatically disabling the one or more condition reporting functions.

3. The method as recited in claim 1, further comprising:
causing an indication associated with the conditions report to be displayed on the other snow rider device, the indication being displayed in association with the selection mechanism and the particular region within the region map.

4. The method as recited in claim 3, wherein the causing the indication associated with the conditions report to be displayed is based at least in part on a pre-defined relationship between a first snow rider associated with the snow rider device and a second snow rider associated with the other snow rider device.

5. The method as recited in claim 1, wherein the particular region comprises an element identifiable via a ski area map, the element including at least one of a ski run, a chair lift, or a building.

6. The method as recited in claim 1, wherein the one or more condition reporting functions enable a snow rider associated with the snow rider device to select and provide information associated with at least one of precipitation, wind, visibility, surface conditions, a ski crowd, or a chair lift wait.

7. The method as recited in claim 6, wherein the selection mechanism comprises a sliding selection mechanism.

8. One or more computing devices configured to share a conditions report received from an approved snow rider device, comprising:
one or more processors;
one or more memories storing instructions that, when executed on the one or more processors, configure the one or more computing devices to:
identify, via automatic locating functionality, a snow rider device that is located within a pre-defined geo-fence, wherein the pre-defined geo-fence is associated with a ski area boundary and is used to approve a snow rider device as a valid source of conditions reporting;
in response to identifying the snow rider device, enable one or more condition reporting functions associated with the snow rider device;
determine a location of the snow rider device;
correlate, using a region map associated with the pre-defined geo-fence, the location of the snow rider device with a particular region of a plurality of regions within the region map;
receive a conditions report from the snow rider device;
record a time when the conditions report is received;
store the conditions report in association with the particular region and the time;
cause a selection mechanism to be displayed on another snow rider device to enable a snow rider of the other snow rider device to make a selection without having to provide textual input;
receive, from the other snow rider device, an indication of the selection; and
provide the conditions report to the other snow rider device based at least in part on the received indication of the selection.

9. The one or more computing devices as recited in claim 8, wherein the conditions reports provided is based at least in part on a pre-defined relationship between a first snow rider associated with the snow rider device and another snow rider associated with the other snow rider device.

10. The one or more computing devices as recited in claim 8, wherein the instructions further configure the one or more computing devices to disable the one or more condition reporting functions in response to determining that the snow rider device has exited the pre-defined geo-fence.

11. The one or more computing devices as recited in claim 8, wherein the conditions report includes information related to at least one of precipitation, wind, visibility, surface conditions, a ski crowd, or a chair lift wait.

12. The one or more computing devices as recited in claim 8, wherein the instructions further configure the one or more computing devices to cause an indication associated with the conditions report to be displayed on the other snow rider device, the indication being displayed in association with the selection mechanism and the particular region within the region map.

13. The one or more computing devices as recited in claim 8, wherein the particular region comprises an element identifiable via a ski area map, the element including at least one of a ski run, a chair lift, or a building.

14. The one or more computing devices as recited in claim 8, wherein the one or more condition reporting functions enable a snow rider associated with the snow rider device to select and provide information associated with at least one of precipitation, wind, visibility, surface conditions, a ski crowd, or a chair lift wait.

15. The one or more computing devices as recited in claim 8, wherein the selection mechanism comprises a sliding selection mechanism.

\* \* \* \* \*